(12) United States Patent
Ko

(10) Patent No.: US 6,421,954 B2
(45) Date of Patent: Jul. 23, 2002

(54) SUNSHADE FOR AGRICULTURAL USE

(76) Inventor: Ming-Hsien Ko, No. 135, Lane 22, Chang-Ting Rd., Lu-Kang Chen, Chang-Hua Hsien (TW)

(*) Notice: Subject to any disclaimer, the term of this patent is extended or adjusted under 35 U.S.C. 154(b) by 0 days.

(21) Appl. No.: 09/866,303

(22) Filed: May 25, 2001

Related U.S. Application Data

(63) Continuation-in-part of application No. 09/412,155, filed on Oct. 5, 1999, now abandoned.

(51) Int. Cl.$^7$ ............................................... A01G 13/00
(52) U.S. Cl. .............................. 47/31; 47/29.5; 47/20.1
(58) Field of Search ......................... 47/29, 28.1, 20.1, 47/22.1, 23.1, 23.2, 24.1, 29.1, 31, 31.1, 26, 20; 135/125, 90, 115; 428/131; 52/664

(56) References Cited

U.S. PATENT DOCUMENTS

| | | | |
|---|---|---|---|
| 1,106,624 A | * 8/1914 | Allader et al. | 135/903 |
| 2,051,643 A | * 8/1936 | Morrison | 112/417 |
| 2,143,659 A | * 1/1939 | Morrison | 112/417 |
| 2,931,373 A | * 4/1960 | Larson | 135/116 |
| 2,967,533 A | * 1/1961 | Ballinger | 134/140 |
| 2,974,442 A | * 3/1961 | Womelsdorf | 47/32 |
| 3,162,920 A | * 12/1964 | Durham | 135/115 |
| 3,581,436 A | * 6/1971 | Basiger | 135/87 |
| 3,593,997 A | * 7/1971 | Boehner | 135/120.4 |
| 5,437,298 A | * 8/1995 | Lin | 108/129 |
| 5,451,445 A | * 9/1995 | Wang | 160/84.01 |
| 5,489,136 A | * 2/1996 | Pank | 160/370.21 |
| 5,560,384 A | * 10/1996 | Oh | 135/115 |
| 5,975,613 A | * 11/1999 | Sippel | 296/77.1 |
| 5,992,088 A | * 11/1999 | Henningsson et al. | 160/84.01 |

FOREIGN PATENT DOCUMENTS

| | | | | |
|---|---|---|---|---|
| JP | 406121625 A | * 5/1994 | | A01G/13/02 |

* cited by examiner

*Primary Examiner*—Peter M. Poon
*Assistant Examiner*—Andrea Valenti
(74) *Attorney, Agent, or Firm*—Ladas & Parry

(57) ABSTRACT

A sunshade includes an intermediate net portion having mono filament circular weft yarns interlaced with flat warp yarns, two stringing sections which are formed on two sides of the intermediate net portion and each of which has a limit portion which is interposed between two weft-free portions and which is folded to lay the weft-free portions one over the other, two opposite drape portions extending from the stringing sections, respectively, and a pair of strings threading through and fastening together the weft-free portions.

1 Claim, 4 Drawing Sheets

SUNSHADE FOR AGRICULTURAL USE

CROSS-REFERENCE TO RELATED APPLICATION

This application is a continuation-in-part (CHIP) of abandoned U.S. patent application Ser. No. 09/412,155, filed by the applicant on Oct. 5, 2000, the entire disclosure of which is incorporated herein by reference.

BACKGROUND OF THE INVENTION

1. Field of the Invention

This invention relates to a sunshade, more particularly to a sunshade for intercepting sun rays above plants in a field.

2. Description of the Related Art

FIG. 1 illustrates a conventional sunshade for intercepting sun rays above plants in a field. The sunshade includes a pair of opposing strings 4, and a plurality of spaced apart net portions 6 attached to said strings 4. The net portions 6 are aligned parallel along the length of and extend downwardly from the strings 4. Each net portion 6 has intersecting warp and weft filaments 1, 2. The warp filaments 1 extend transversely to the strings 4, and the weft filaments 2 extend downwardly from each net portion 6. Each weft filament 2 has an interlaced portion 3 interlaced with the warp filament 1, and a free portion 5 extending downwardly from the interlaced portion 3. The free portions 5 of the weft filaments 2 can be swung by the wind, thereby providing a dynamic shade for the plants. However, the above described sunshade has a disadvantage in that the weft filaments 2 near the strings 4 can be easily wound up around the strings 4 when the wind blows (see FIG. 2), thereby losing its ability to provide shade. Moreover, it is laborious to restore the filaments 2 to their original places.

SUMMARY OF THE INVENTION

Therefore, it is an object of the present invention to provide a sunshade that is capable of overcoming the aforementioned disadvantage.

Accordingly, a sunshade for intercepting sun rays above plants in a field of this invention is characterized by: an intermediate net portion which includes a plurality of flat warp yarns and a plurality of first mono filament circular weft yarns interlaced with the flat warp yarns; two stringing sections formed on two sides of the intermediate net portion, the flat warp yarns extending into the two stringing sections from the net portion, each of the stringing sections having two spaced-apart first weft-free portions and a limit portion interposed between the first weft-free portions, the limit portion having a plurality of second mono filament circular weft yarns interlaced with the flat warp yarns, the limit portion be folded to lay the first weft-free portions one over the other; two opposite drape portions extending from the stringing sections, respectively, opposite to the net portion, the flat warp yarns extending into the two drape portions from the stringing sections, each of the drape portions having a plurality of third mono filament circular weft yarns interlaced with the warp yarns adjacent to a corresponding one of the stringing sections, and a second weft-free portion extending away from the third mono filament circular weft yarns; and a pair of strings threading through and fastening together the first weft-free portions of the stringing sections, wherein the two drape portions extend downward from the stringing sections, respectively, when the net portion is placed substantially horizontally, and wherein the distance between the strings is greater than half the distance between each of the strings and the bottom most end of the corresponding one of the drape portions.

BRIEF DESCRIPTION OF THE DRAWINGS

In drawings which illustrate an embodiment of the invention.

DETAILED DESCRIPTION OF THE PREFERRED EMBODIMENT

Figure 3:
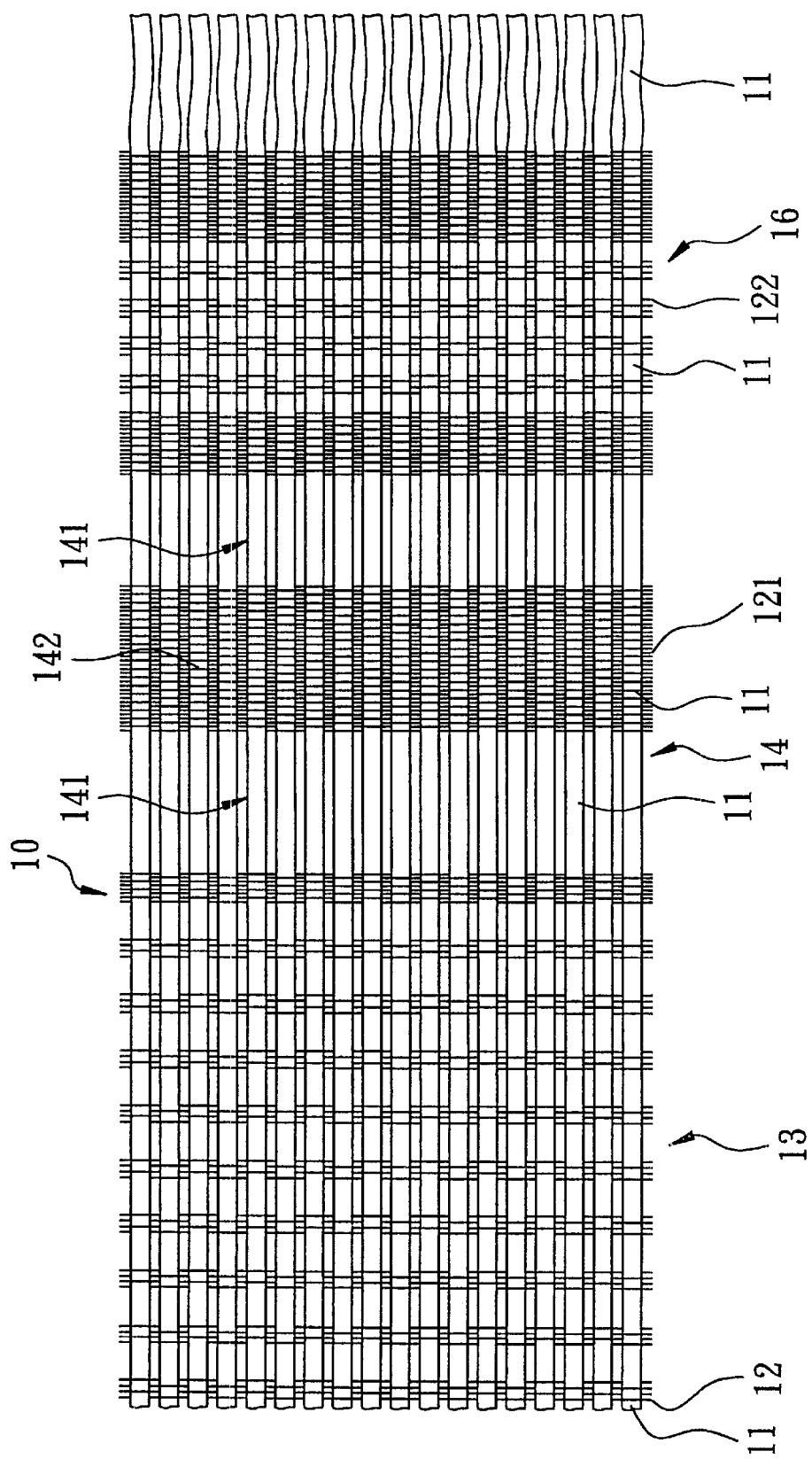
FIG. 3 is a fragmentary plan view of a sunshade embodying this invention.
Figure 4:
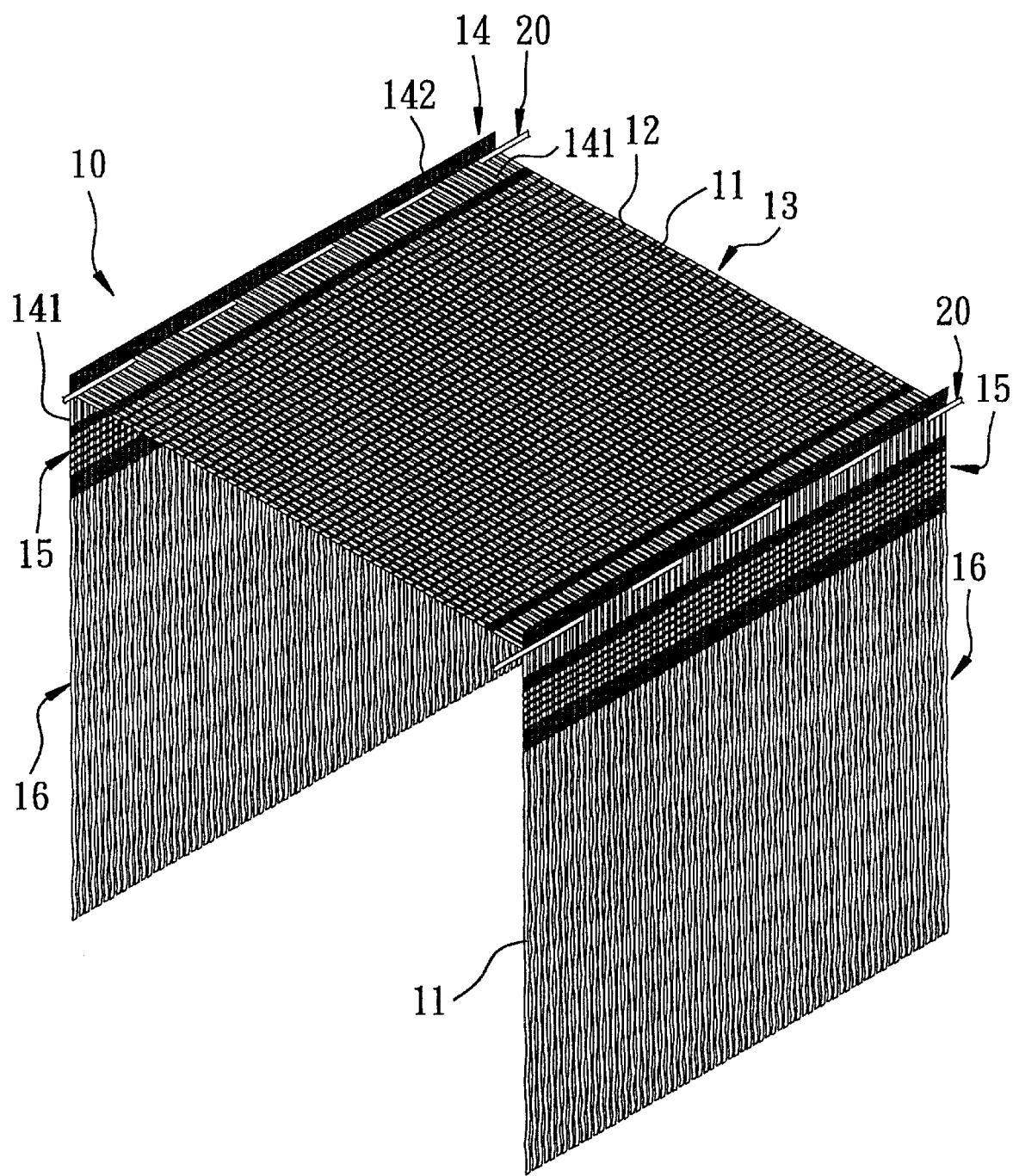
FIG. 4 is a perspective view of the sunshade of FIG. 3.

FIGS. 3 and 4 illustrate a sunshade 10 embodying this invention. The sunshade 10 has an intermediate net portion 13 which includes a plurality of flat warp yarns 11 and a plurality of first mono filament circular weft yarns 12 interlaced with the flat warp yarns 11.

Two stringing sections 14 are formed on two sides of the intermediate net portion 13, respectively. The flat warp yarns 11 of the net portion 13 extend into the two stringing sections 14 from the two sides of the net portion 13. Each of the stringing sections 14 has two spaced-apart first weft-free portions 141 and a limit portion 142 interposed between the first weft-free portions 141. Each limit portion 142 has a plurality of second mono filament circular weft yarns 121 interlaced with the flat warp yarns 11. Each limit portion 142 is folded to lay the first weft-free portions 141 one over the other.

Two opposite drape portions 16 extend from the stringing sections 14, respectively, opposite to the net portion 13. The flat warp yarns 11 of the net portion 13 extend into the two drape portions 16 from the stringing sections 14. Each of the drape portions 16 includes a positioning portion 15 that has a plurality of third mono filament circular weft yarns 122 interlaced with the warp yarns 11 adjacent to a corresponding one of the stringing sections 14, and a second weft-free portion 161 that extends away from the positioning portion 15.

A pair of strings 20 thread through and fasten together the first weft-free portions 141 of the stringing sections 14, wherein the two drape portions 16 extend downward from the stringing sections 14, respectively, when the net portion 13 is placed substantially horizontally, and wherein the distance between the strings 20 is greater than half the distance between each of the strings 20 and the bottom most end of the corresponding one of the drape portions 16.

Figure 1:
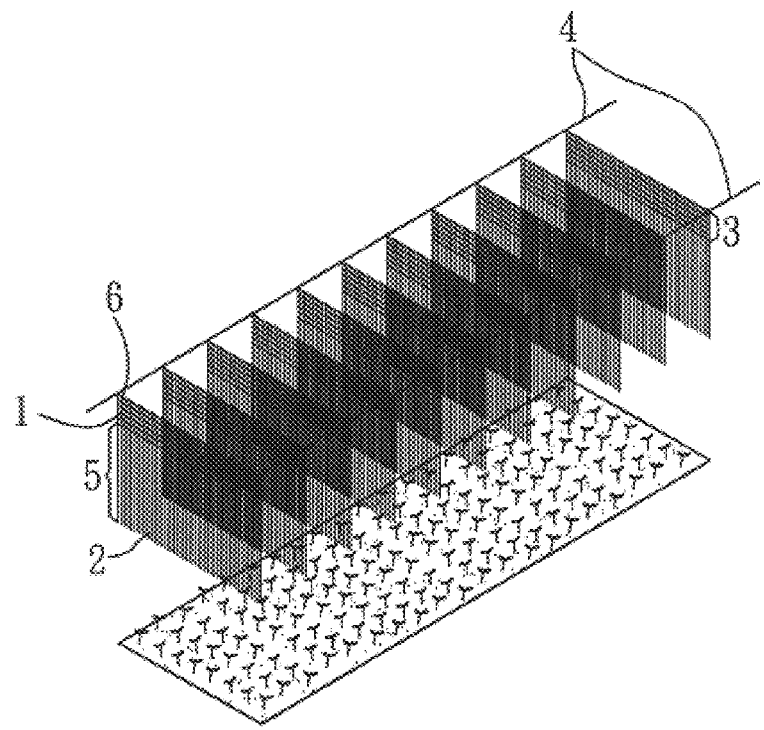
FIG. 1 is a schematic perspective view of a conventional sunshade installed on a field.
Figure 2:
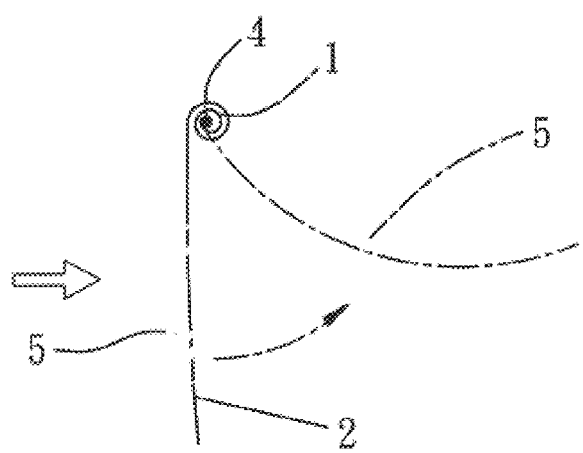
FIG. 2 is a fragmentary side view of the sunshade of FIG. 1 with filaments wound around strings due to blowing of the wind.
Figure 5:
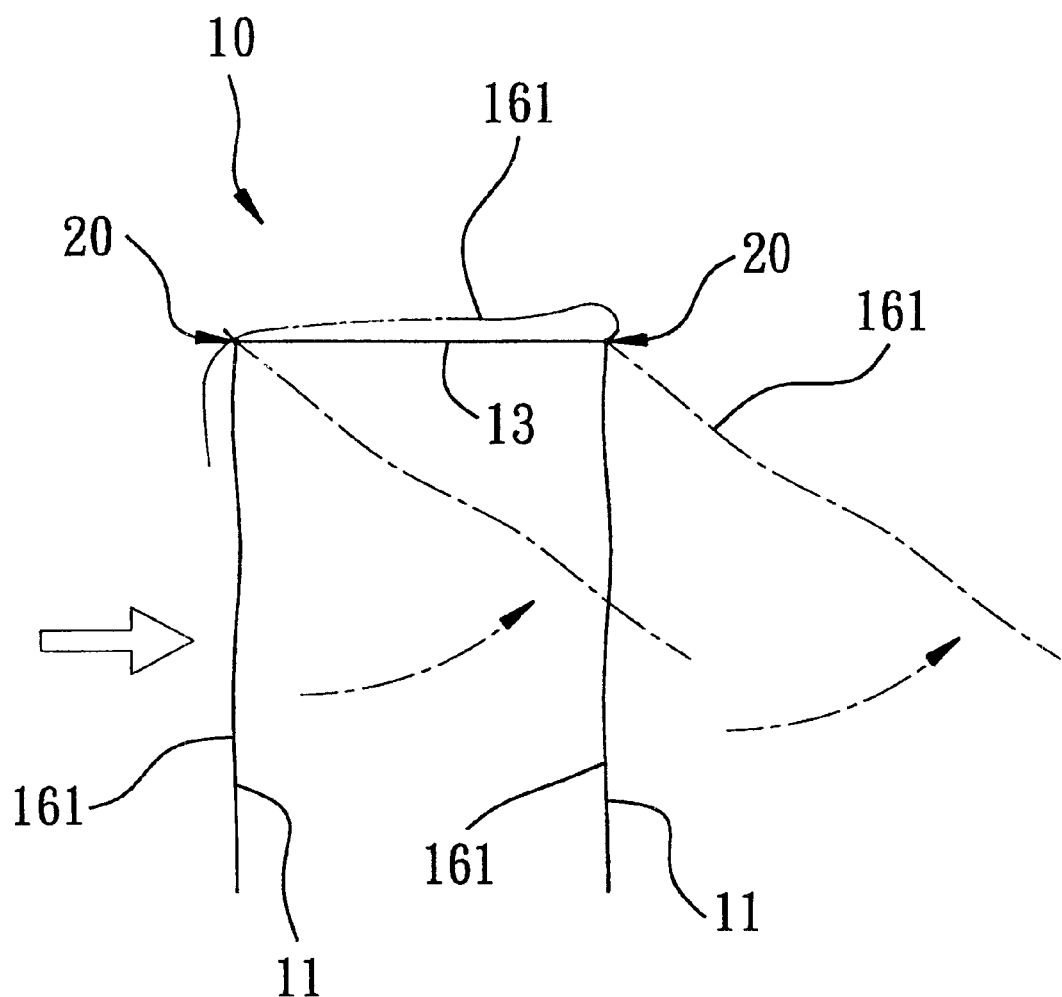
FIG. 5 is a schematic side view of the sunshade of FIG. 3 with filaments swung to lay on a net portion due to blowing of the wind.

Referring now to FIG. 5 in combination with FIGS. 3 and 4, in contrast with the aforementioned winding problem that occurs in the conventional sunshade of FIG. 1, the weft-free portions 161 of the drape portions 16 of the sunshade 10 of this invention are swung to lay only on the net portion 13 when blown by the wind. However, these weft-free portions 161 of the drape portions 16 can be easily restored to their original places by another gust of wind or by hand.

The arrangement of the limit portions 142 of the stringing sections 14 permit the strings 20 to be well positioned within the stringing sections 14, respectively, and the arrangement of the positioning portions 15 of the drape portions 16 can prevent the second weft-free portions 161 of the drape portions 16 from becoming entangled when blown by the wind.

The sunshade 10 of this invention not only provides static shade by virtue of the net portion 13, but also dynamic shade by virtue of the two opposite drape portions 16.

With the invention thus explained, it is apparent that various modifications and variations can be made without departing from the spirit of the present invention.

I claim:

1. A sunshade for intercepting sun rays above plants in a field, comprising:

an intermediate net portion which includes a plurality of flat warp yarns and a plurality of first mono filament circular weft yarns interlaced with said flat warp yarns;

two stringing sections formed on two sides of said intermediate net portion, said flat warp yarns extending into said two stringing sections from said intermediate net portion, each of said stringing sections having two spaced-apart first weft-free portions and a limit portion interposed between said first weft-free portions, said limit portion having a plurality of second mono filament circular weft yarns interlaced with said flat warp yarns, said limit portion being folded to lay said first weft-free portions one over the other;

two opposite drape portions extending from said stringing sections, respectively, opposite to said intermediate net portion, said flat warp yarns extending into said two drape portions from said stringing sections, each of said drape portions having a plurality of third mono filament circular weft yarns interlaced with said warp yarns adjacent to a corresponding one of said stringing sections, and a second weft-free portion extending away from said third mono filament circular weft yarns; and a pair of strings threading through and fastening together said first weft-free portions of said stringing sections, wherein said two drape portions extend downward from said stringing sections, respectively, when said net portion is placed substantially horizontally, and wherein the distance between said strings is greater than half the distance between each of said strings and the bottom most end of the corresponding one of said drape portions.

\* \* \* \* \*